(12) United States Patent
Chang

(10) Patent No.: US 6,394,614 B1
(45) Date of Patent: May 28, 2002

(54) VEHICLE AUTOMATIC ANTI-GLARE DEVICE

(75) Inventor: Chia-Jung Chang, No. 14, Alley 60, Lane 109, Fusan Street, Pianchiao, Taipei Hsien (TW)

(73) Assignees: Chia-Jung Chang, Taipei Hsien; San-Shun Chen, Taipei, both of (TW)

( * ) Notice: Subject to any disclaimer, the term of this patent is extended or adjusted under 35 U.S.C. 154(b) by 0 days.

(21) Appl. No.: 09/968,534

(22) Filed: Dec. 17, 2001

(30) Foreign Application Priority Data

Oct. 2, 2000 (TW) ......................................... 089217038
Oct. 31, 2000 (TW) ......................................... 089218901

(51) Int. Cl.$^7$ ............................................... G02B 27/00
(52) U.S. Cl. ....................... 359/604; 359/607; 359/608; 359/601; 359/602; 359/603
(58) Field of Search ................................. 359/604, 607, 359/608, 601, 602, 603, 265, 267, 272, 273, 275, 276, 277

(56) References Cited

U.S. PATENT DOCUMENTS

| | | | | |
|---|---|---|---|---|
| 5,469,296 A | * | 11/1995 | Ohno et al. .................. | 359/603 |
| 5,486,952 A | * | 1/1996 | Nagao et al. ................ | 359/603 |
| 5,812,321 A | * | 9/1998 | Schierbeek et al. .......... | 359/601 |
| 5,940,201 A | * | 8/1999 | Ash et al. .................... | 359/267 |
| 6,111,683 A | * | 8/2000 | Cammenga et al. ........ | 359/267 |
| 6,246,507 B1 | * | 6/2001 | Bauer et al. ................. | 359/267 |
| 6,291,906 B1 | * | 9/2001 | Marcus et al. .............. | 359/603 |

* cited by examiner

*Primary Examiner*—Mohammad Sikder
(74) *Attorney, Agent, or Firm*—Bacon & Thomas

(57) ABSTRACT

A vehicle automatic anti-glare device comprises a LCD panel having a function of being converted into a "non-light filtering" mode from a "light filtering" mode as voltage is applied thereon; a reflection film installed at a back side of said LCD panel, when the said LCD panel is in a "light filtering" mode, said reflection film reflects the light of said LCD panel so that said LCD panel reflects images; a light sensor for detecting the light intensity of the light radiated to said LCD panel and sends out a signal; and a control module for receiving an output signal from said light sensor. As the signal is over is default value, then a pressure is applied to the LCD panel so that said LCD panel is converted into a "non-light filtering" mode. The control module has a data receiving device which receives the data from a microcomputer in a vehicle and then transfers said data to said LCD panel. A back side of said LCD panel is installed with a battery device and a retainer seat for receiving said control module so that said LCD panel has power for operation, and via the said retainer seat, said LCD panel is fixed and connected to said rear-view mirror of a vehicle. Thereby, the user may install the vehicle automatic anti-glare device himself (or herself).

33 Claims, 11 Drawing Sheets

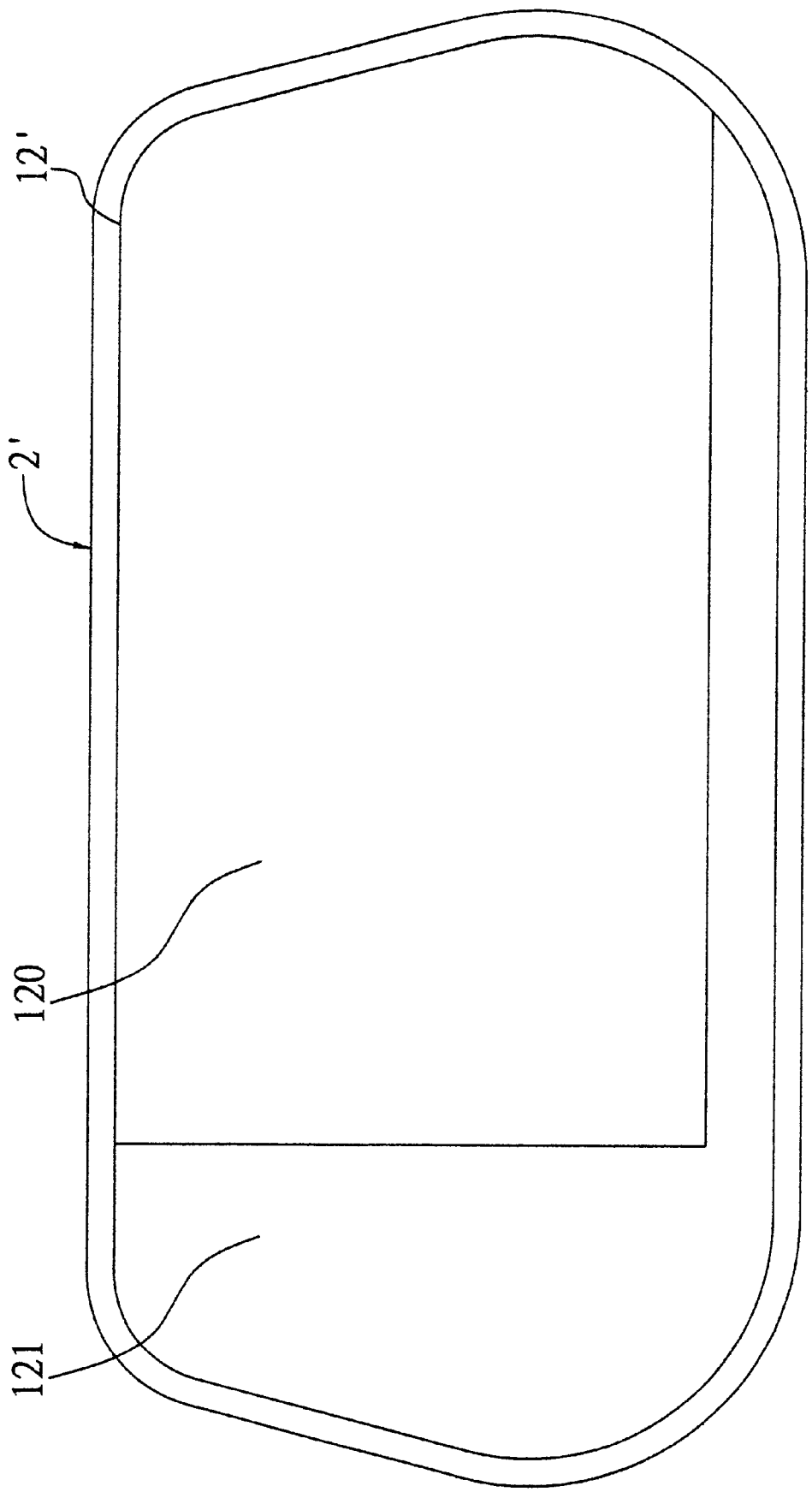

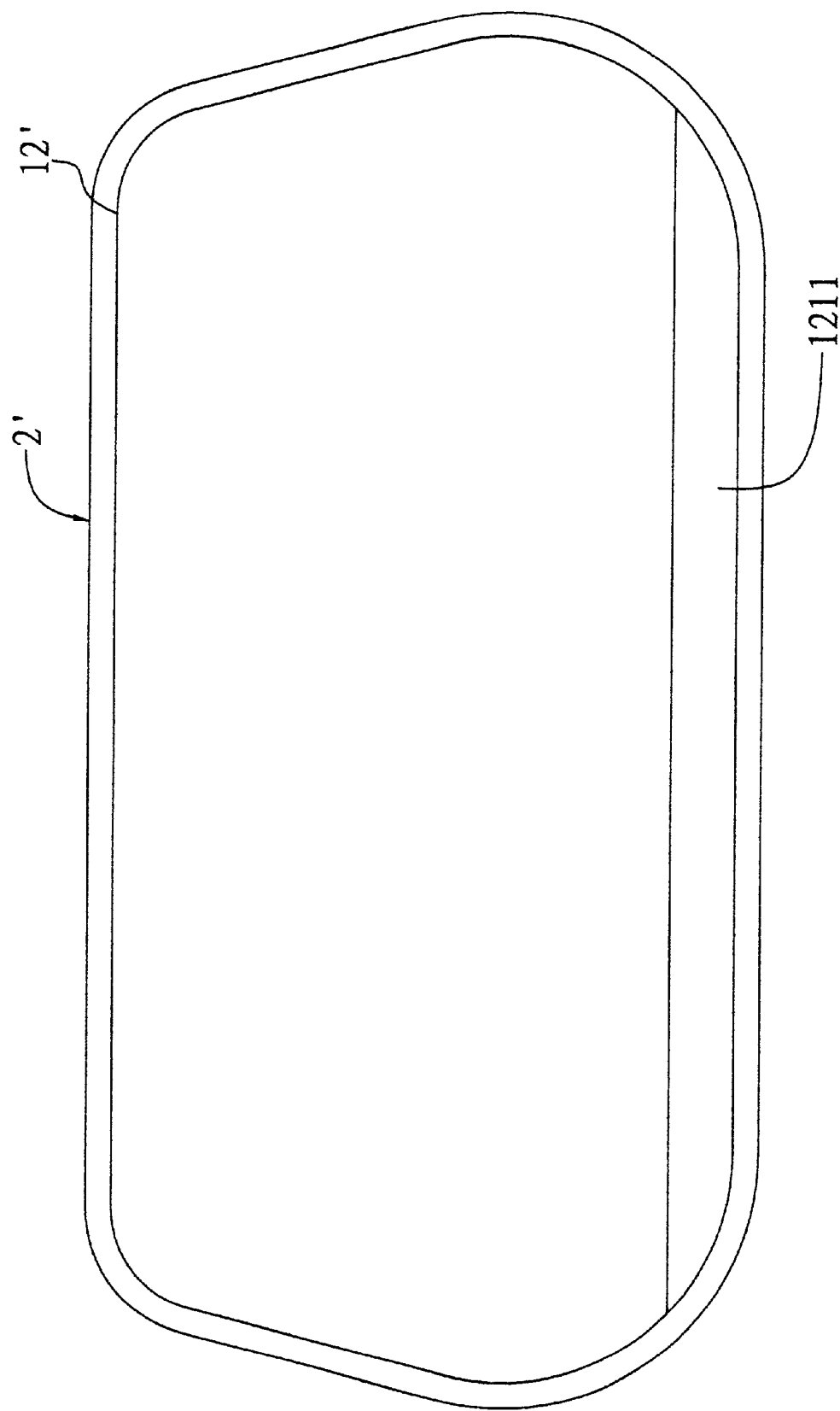

VEHICLE AUTOMATIC ANTI-GLARE DEVICE

FIELD OF THE INVENTION

The present invention relates to a vehicle automatic anti-glare device. To be more specific, it contains a rear-view mirror with a liquid crystal display (LCD) panel in a vehicle, which displays the operating conditions of all devices in the vehicle. When a strong light is cast on the rear-view mirror, the LCD panel on the rear-view mirror automatically stops the light from filtering in by switching into a "light-filtering" mode, and thus prevents glaring.

BACKGROUND OF THE INVENTION

In general, rear-view mirrors include an interior mirror and are positioned below the windshield glass, and exterior mirrors. The driver can adjust the angle of the rear-view mirrors so that he/she can view the reflection of the road conditions behind and on both sides of the car through these mirrors.

However, the rear-view mirrors in prior art are plane reflectors. Therefore, when scenery outside the car is reflected in the rear-view mirrors, lights produced outside the car (e.g. lights from other vehicles, streetlights, and sun light, etc) are also reflected in the mirrors. The light may have glaring effect on the driver, whose vision may be adversely affected as a result. This is particularly dangerous when the vehicle is traveling at high speed when the strong light is radiated onto the mirrors.

Furthermore, the only function such prior art rear-view mirror has is to reflect the traffic conditions outside the vehicle, no further function is provided.

SUMMARY OF THE INVENTION

Accordingly, the primary object of the present invention is to provide a vehicle automatic anti-glare device, wherein a rear-view mirror is provided for which automatically blocks out glare, in accordance with the intensity of the light cast upon the mirrors. An object of the present invention is to provide a rear-view mirror that displays the operating conditions of the interior devices of the vehicle.

Another object of the present invention is to provide a vehicle automatic anti-glare device which can be easily installed by the user himself/herself.

A further object of the present invention is to provide a vehicle automatic anti-glare device that can be manufactured on a large scale and can be commonly used.

To achieve the above objects, the present invention provides a vehicle automatic anti-glare device which comprises:

- a LCD panel which is able to switch from "NON-light filtering" mode into "light filtering" mode when it is charged with electricity.
- a reflection film installed at a back of the said LCD panel, so that when the said LCD panel is in "NON-light filtering" mode, the light cast upon the said LCD panel is reflected, and the LCD panel reflects images like a mirror.
- a light sensor, which is used for detecting any light radiated onto the LCD panel; it then sends out a signal which is in accordance with the intensity of the light radiated.
- a control module, which is used for receiving signal sent out from the said light sensor; when the strength of the signal exceeds the default value, electric current is applied to the LCD panel, and the said LCD panel is switched into "light filtering" mode.

The control module has a data-receiving device that receives the data from a microcomputer in the vehicle and then transfers the received data to the LCD panel.

In another embodiment, battery is installed in a retainer seat for containing the control module, so that the LCD panel is charged with electricity, and thus its anti-glare design can take effect. Also, the LCD panel and the rear-view mirrors are firmed joint to allow easy installation by the user.

The LCD visual area is determined by the minimum area of specific range of different vehicle lenses. The edges of this visual area are kept wide to allow room for adjustment to suit different sizes of vehicles; this also allows production on a large scale.

The appended drawings provide a detailed explanation of the functions of this current invention.

BRIEF DESCRIPTION OF THE DRAWINGS

FIGS. 4(A)–4(D) are front views of an embodiment of the interior mirror of the vehicle automatic anti-glare device as set out in FIG 3.

DETAILED DESCRIPTION OF THE PREFERRED EMBODIMENTS

Figure 1:
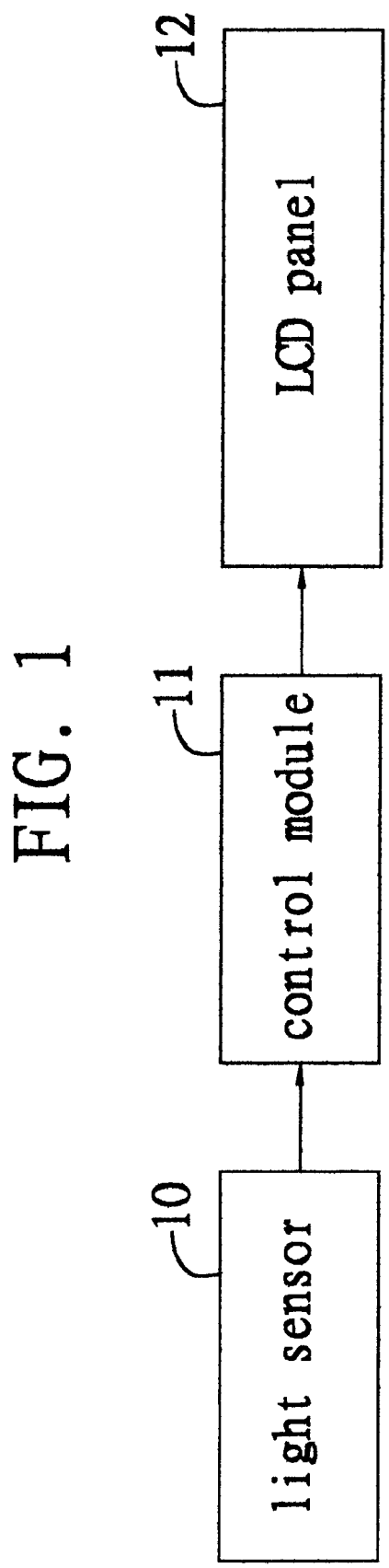
FIG. 1 is a structural block-diagram of the vehicle automatic anti-glare device of the present invention.

FIG. 1 illustrates a structural block-view of the vehicle automatic anti-glare device both inside and outside (on both sides) of the vehicle. . The rear-view mirror is installed in a vehicle. The rear-view mirrors include a light sensor 10, a control module 11, and a LCD panel 12.

The light sensor 10 detects the intensity of light of the light cast on the LCD panel 12, and then sends out a signal to the control module 11.

The control module 11 receives the signal from the light sensor 10. When the signal exceeds the default value, electricity current is applied to the LCD panel 12; this switches LCD panel 12 into light-filtering mode.

In general, LCD panel 12 is formed by installing 2 pieces of glass base (not shown) between two parallel light filters (not shown), and a number of parallel trenches containing liquid crystal molecule directional films (not shown). Liquid crystal molecules are filled in between the two liquid crystal molecule directional films (not shown). The angle of one of the liquid crystal molecule directional films has been adjusted, so that the trench on top of it is positioned in a 90-degree angle with another trench. The structures and operational principle of liquid crystal molecules are known to those skilled in the art and not the main scope of the present invention, thus the details will not be described in length here. Regarding the treatment of LCD panel 12 under the present invention, other than sticking a prior art reflective mirror onto the reverse side of the LCD panel (the reverse side is further from the viewer, facing the front of the vehicle), it is also possible to plate chromium at a normal temperature to form a refection film (not shown) on the reverse side of the first glass base (the reverse side is further from the viewer, facing the front of the vehicle) of the LCD panel 12. Therefore, when the LCD panel 12 is in the NON-light filtering mode, the light cast on LCD panel 12 is reflected, and LCD panel 12 reflects light like a mirror. An ultra-violet-ray-proof coating process is performed on the parallel light filter mirror on the outer surface of LCD panel 12 so that LCD panel 12 is durable under climatic changes.

Figure 2:
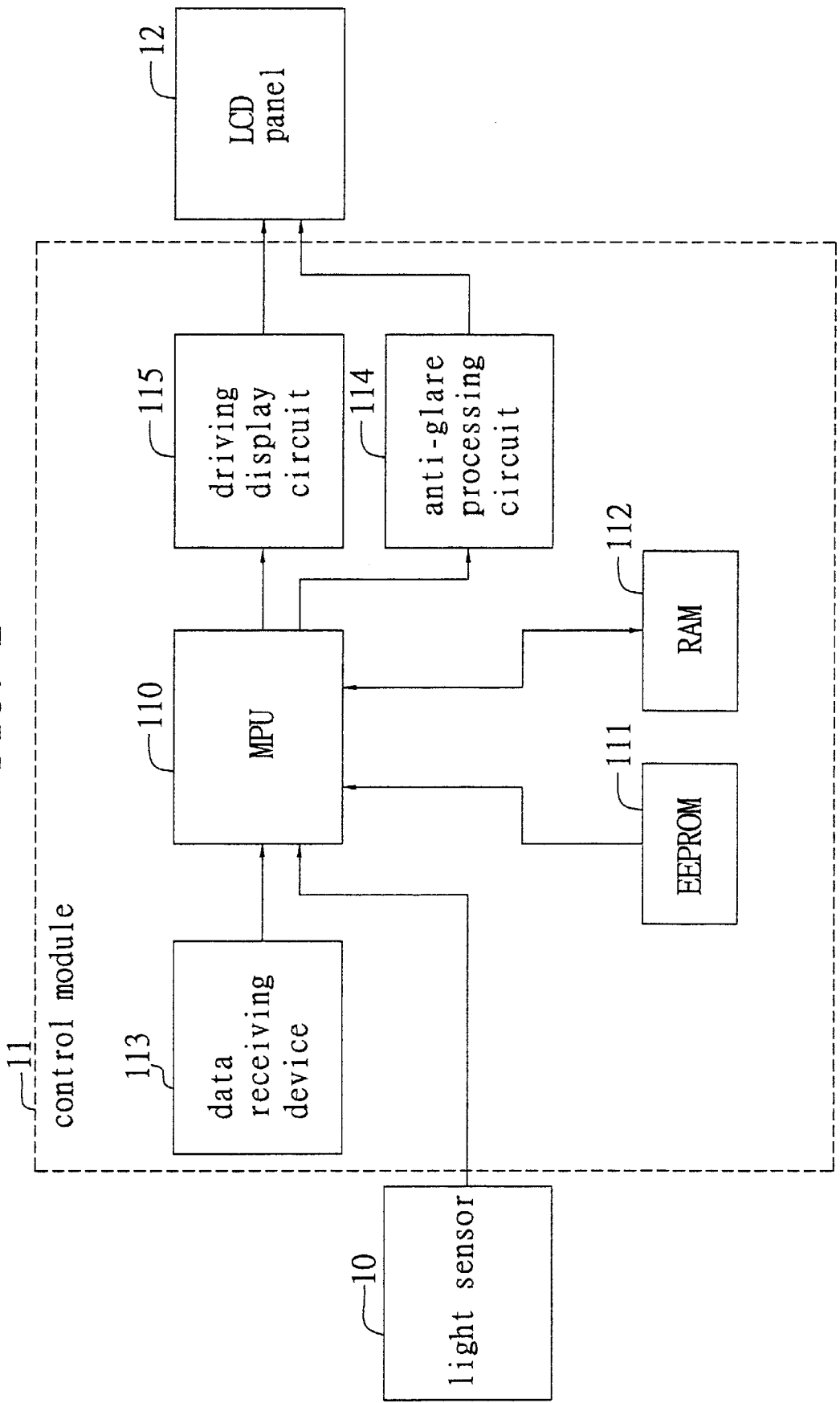
FIG. 2 is a front view of the vehicle automatic anti-glare device according to the present invention.

At first, when light sensor 10 detects light, it sends out a signal which is in accordance with the intensity of the light, to control module 11. Then, the control module 11 determines whether the intensity of the light exceeds the default value. If not, no voltage is applied to the LCD panel 12 to allow the LCD panel 12 to have the reflective function of prior art rear-view mirrors, and traffic conditions are reflected in the mirrors for the driver; at this time, LCD panel 12 is in "NON-light filtering" mode. On the contrary, where the intensity of the light exceeds the default value, the control module 11 applies voltage to the liquid crystal molecule directional film in the LCD panel 12. This will induce vertical electric current to be generated between the first and second Liquid crystal molecule direction film. As such, the liquid crystal molecules will be arranged according to the direction of current and are perpendicular to the two Liquid crystal molecule direction films. Note that originally, the liquid crystal molecules had to be arranged in a 90 degrees angle and 3D spiral position and change directions to allow penetration of the incident light of the second layer of the parallel light filter (which is closer to the viewer, facing the back of the vehicle). Now the incident light cannot pass through the second layer parallel light filter, and no penetration occurs. Therefore, the LCD panel 12 is in "light-filtering" mode and strong light cannot be reflected from the LCD panel 12, so the glaring effect is avoided effectively. As shown in FIGS. 2(A) and 2(B), which are the front view of the interior mirror 2 and exterior mirror 3 of the vehicle automatic anti-glare device of the present invention, wherein the light sensor 10 is embedded inside the LCD panel 12.

Figure 3:
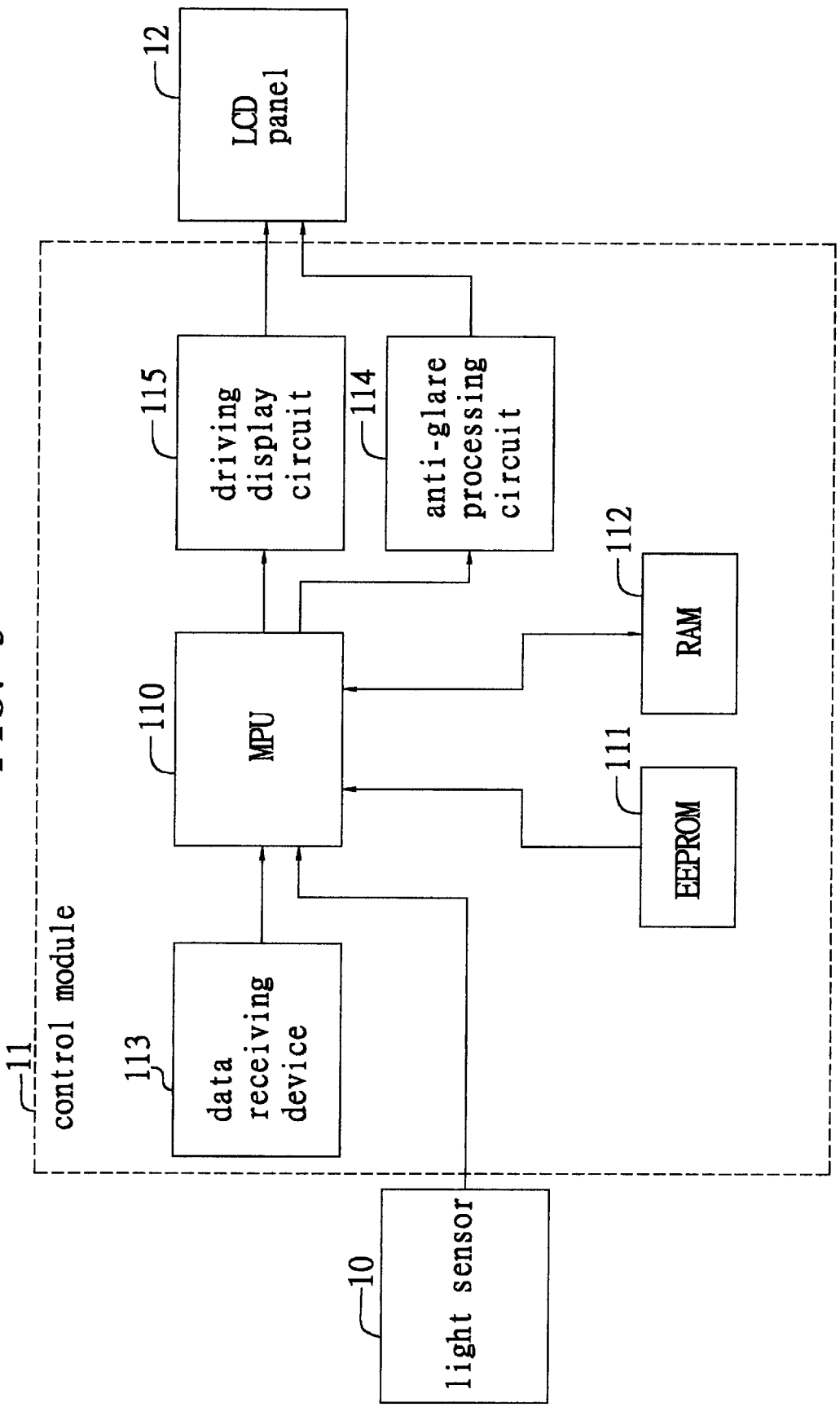
FIG. 3 is a detailed structural block-diagram of the vehicle automatic anti-glare device according to the present invention.

FIG. 3 shows a detailed block-diagram of the vehicle automatic anti-glare device according to the present invention, where the parts identical to those in FIG. 1 are neglected. The control module 11 includes a processor 110 inside a printed circuit board (not shown), an electric erasable programmable read-only memory (referred to as EEPROM from here onwards) 111, a random accessing memory (brief, called as RAM), a driving display circuit 115, a anti-glare processing circuit 114 and a data receiving device 113, etc., and a battery or vehicle power source is used as the power source.

The processor 110 runs the control program stored in the memory or the chip on a printed circuit board. Further, the processor 110 processes or analyzes the data from the light sensor 10 and data-receiving device 113. EEPROM 111 can record a display driving program about LCD panel 12, for indicating the displaying positions (will be described in the following) of some fixed patterns of pictures on the LCD panel 12. Also, when the LCD panel is implementing the "non-light-filtering" or "light-filtering" mode, the switch between the 2 modes is displayed, allowing the fixed patterns of each displaying portion to be shown. Further, the EEPROM 111 stores a control program for comparing the signals sent out from the light sensor 10 with a default value. This data-receiving device 113 receives data from a microcomputer (not shown) in the vehicle, it then transfer the data to processor 110. Certain models of vehicles have a microcomputer controller system which is used to control, process and analyze the sensor devices installed in the vehicle, and in which data sent from the sensor devices are stored. A data output terminal (not shown) is used to output the data stored in the memory. Therefore, by using the current structure in the prior art vehicle, data receiving device 113 is connected to the data output terminal, so that the operating information of the vehicle's various devices is displayed on LCD panel 12. This allows for quick information on where the fault occurred and what parts to replace; also, drivers are notified of matters of concern while driving. RAM 112 stores data or signals from data receiving device 113 or light sensor 10. The driving display circuit 115 displays the operating conditions of all devices in the car on LCD panel 12, based on information sent from data receiving device 113 and received by processor 110. Where processor 110 receives signals from light sensor 10 and compares the received signal with the default value stored inside EEPROM 111, and the signal is greater than the default value, anti-glare processing circuit 114 applies voltage to the LCD panel 12, so that the LCD panel 12 is switched to light-filtering mode.

The data receiving device 113 receives the output data from a reverse car radar device installed outside the vehicle, speed sensor in a vehicle, wireless communication device in the vehicle, consumption sensor of fuel tank and radiator, oil and water temperature sensor, vehicle direction processing device, etc (not shown). Therefore, these devices transfer the operation information to the data-receiving device 113. The structures and principles of these devices are well known to those skilled in the art, and thus the detail will be omitted.

Therefore, after the data receiving device 113 receives the operation data on the devices in the vehicle (computed by the vehicle microcomputer), these data are displayed on LCD panel 12 in fixed patterns of pictures. This allows the driver to view all operating conditions of all devices from the rear-view mirror, without having to lower his/her head to check on the dashboard while driving.

Figure 4B:
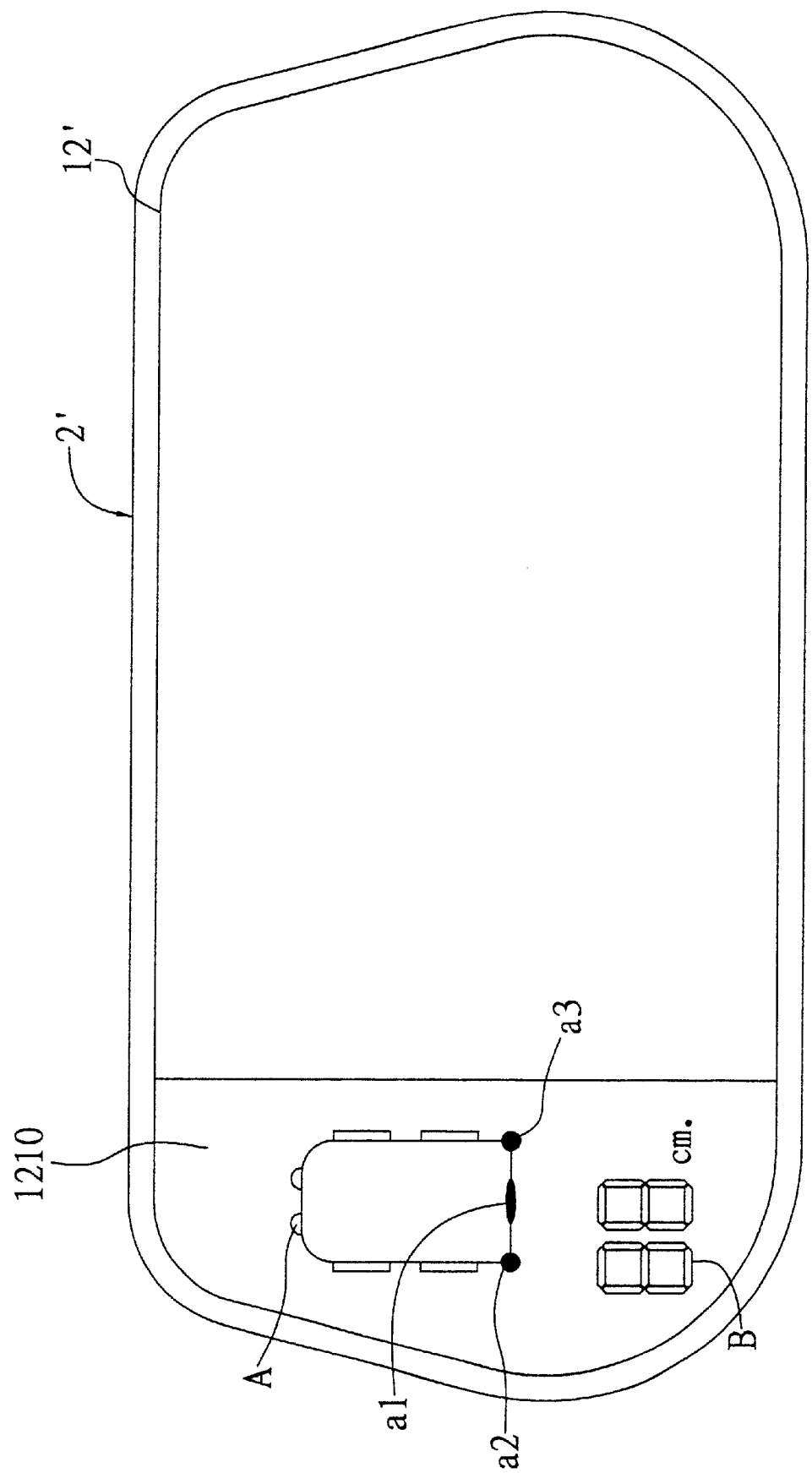
Figure 4D:
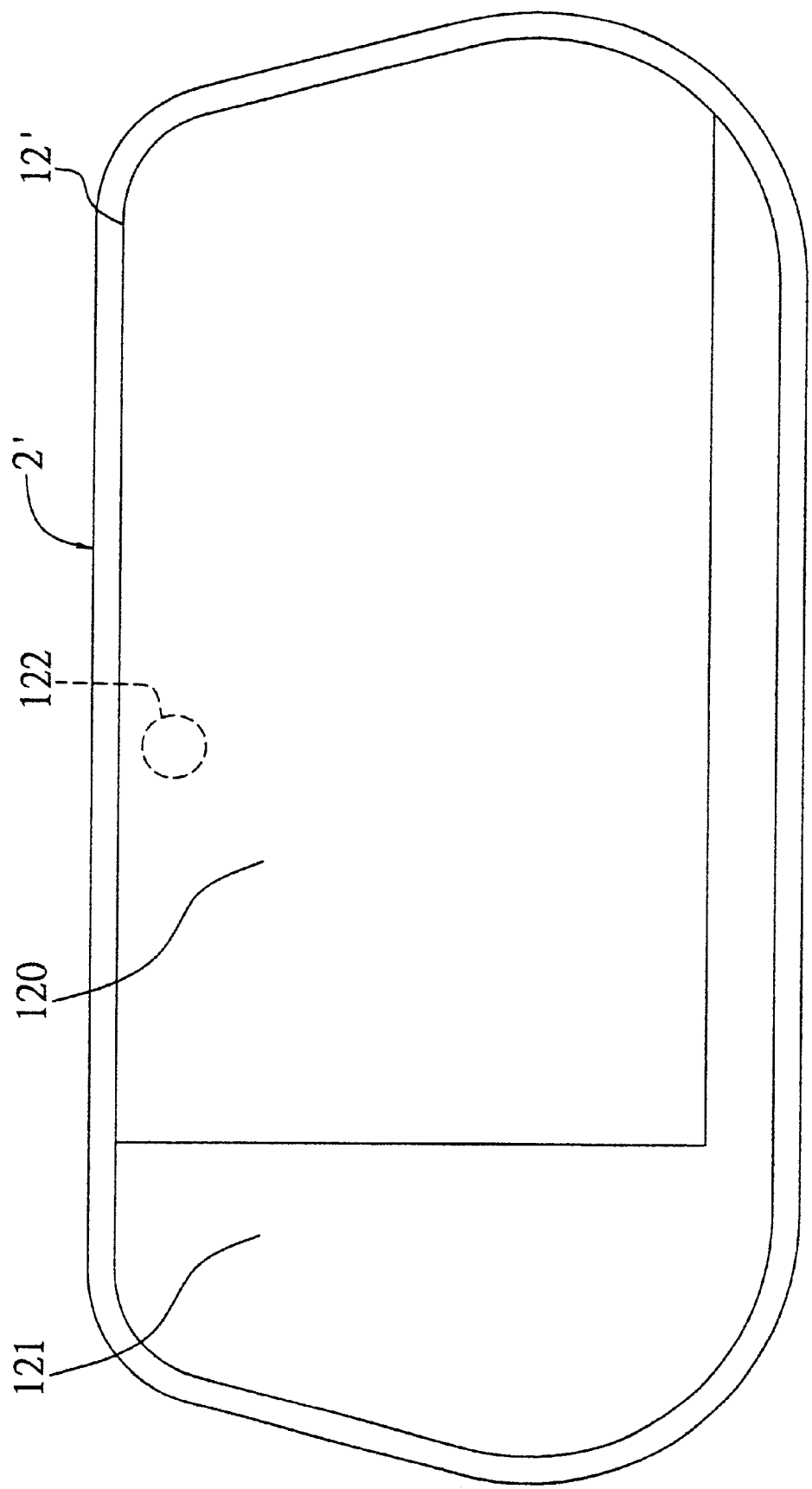

A front view of the rear-view mirror 2 of the vehicle automatic anti-glare device according to the present invention is illustrated in FIG. 4. The rear-view mirror is an interior mirror positioned below the wind shielding glass. A casing 28 covers the outer surface of LCD panel 12 and its side facing the front of the vehicle.

As LCD panel 12 is in the aforesaid "light filtering" or "non-light filtering" mode, the LCD panel 12 is in a "display" mode at the same time, i.e., various operating conditions of different devices in the vehicle are displayed. The control module 11 generates control signals to LCD panel 12, so that LCD panel 12 enters into a "display" mode. As shown in the figure, various fixed patterns of pictures are shown around rear-view mirror 2. The fixed patterns of pictures include: vehicle direction displaying portion 20, oil consumption displaying portion 21, speed displaying portion 22, head light control displaying portion 23, engine temperature displaying portion 24, vehicle parking distance displaying portion 25, communication antenna displaying portion 26 and wiper displaying portion 27. These displays are made as a result of data receiving device 113's receiving operating data from all devices of the vehicle. Vehicle direction displaying portion 20 indicates the car direction from the indicators at the front or rear sides of a vehicle in accordance with the operation of the driver (not shown). Furthermore, the current vehicle direction is displayed on the rear-view mirror 2. The oil consumption displaying portion 21 measures the oil level according to an oil level sensor (not shown), and then displays the result on the rear-view mirror 2. The speed displaying portion 22 displays the vehicle speed measured by a speed detector (not shown). The head light displaying portion 23 displays the head light condition on the rear-view mirror 2, where the condition is detected by the light sensor 10, so that rear-view mirror 2 displays any need to switch on/off the headlight at dusk/dawn. The engine temperature displaying portion 24 display the engine temperature on the rear-view mirror 2 according to the temperature measured by a temperature sensor (not shown) in the engine. Vehicle parking distance-displaying portion 25 detects the distance between the body of the car and the object behind the car via a parking distance sensor, and displays the distance on the rear-view mirror 2. The communication antenna-displaying portion 26 displays the quality of communication according to the measurement of the antenna receiver (not shown) in the vehicle. The wiper displaying portion 27 detects any rain via a rain drop sensor (not shown) outside the vehicle. It then activates the wiper and displays on rear-view mirror 2.

A sleep-proof device 29 is installed below the rear-view mirror 2. The sleep-proof device 29 includes a needle-type camera 290 for detecting the driver's frequency of blinking, and a speaker 291 for playing warning messages to alert the driver. The camera 290 is connected to a MPU 110 (not shown). Through the control of the MPU 110, the camera 290 is activated. The control program and related data for the camera 290 is stored in the EEPROM 111. When the driver becomes sleepy, the blinking frequency starts to decrease. Camera 290 will transfer the detected blinking frequency to MPU 110. MPU 110 compares the detected signal with the default value of the blinking frequency in the EEPROM 111. When the detected value is smaller than the default value, speaker 291 plays a warning message to wake the driver.

Figure 5:
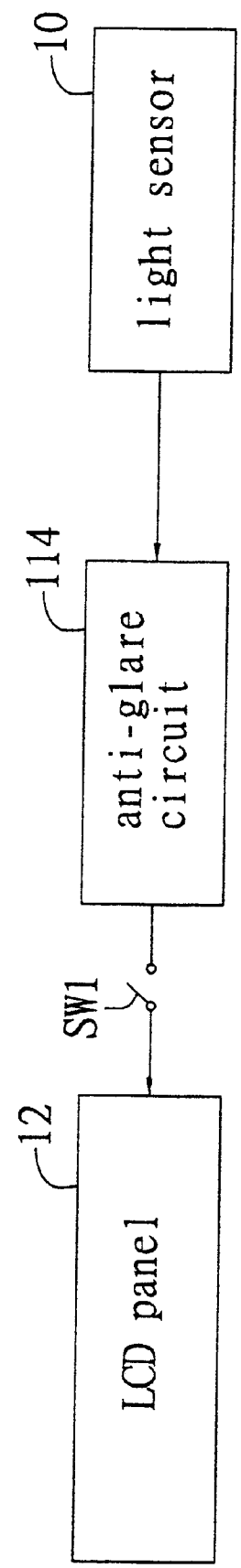
FIG. 5 is a front view of another embodiment of the rear-view mirror of the vehicle automatic anti-glare device of FIG. 3.

FIGS. 5(A)–5(J) are front views of the rear-view mirror of the vehicle automatic anti-glare device in FIG. 3. Referring to FIG. 5(A), the LCD panel 12' has a reflection area 120 for reflecting the view behind the vehicle and a display area 121 for displaying the conditions of the vehicle. As shown in FIG. 5(B), one embodiment of the display area 121 of FIG. 5(A) is illustrated. A vehicle shape A is displayed on the display area 1210. At the back of vehicle shape A, four warning areas a, b, c and d are placed on the display area 1210 for alerting the driver which part of the rear-end area of the vehicle is closer the obstacle. If it is the left rear-end of the vehicle, then warning area a will light up. If it is the rear end of the car, then warning area b or c will light up. If it is the right rear end of the car, then warning area d will light up. At the same time, the lower part B of the display area 1210 immediately shows the remaining distance between the vehicle and the approaching obstacle behind the vehicle. Therefore, the driver is aware of the parking condition. On the other hand, it is also possible to install the warning area on both sides of the rear end of the vehicle shape A and the front end of the vehicle shape A (not shown); when the driver reverses the vehicle, the radar in front of the vehicle is immediately triggered within the set time period when the gear is shift from reverse into drive. Furthermore, as shown in 5(C) 5(D), 5(E) and 5(F), wherein the data receiving device 113 in the control module 11 of the vehicle automatic anti-glare device according to the present invention can also receives data inputted from an external electronic device, such as a PDA, cellular phone, or GPS information (these are not shown) . . . etc. This allows the phone number of incoming calls to be shown on the display area 1211 of the LCD panel 12' when the cellular phone receives an incoming call. In addition, the message storied inside the cellular phone can also be displayed on the display area 12121, and the message stored inside the PDA can be displayed on the display area 1213. On the other hand, maps can be displayed on the display area 1214 via input from GPS, wherein the mark e on the display area 1214 is used to indicate the directions of driving, the mark f is used to display the current location, the mark g is used to display the location of the destination. Besides, a touch-controlled input device (not shown) is installed on the display area (1212, 1213, 1214), allowing the driver to input data on the display area 121 of the rear-view mirror. Therefore, except for displaying all kinds of information about the vehicle as illustrated in FIG. 4, the display area 121 can also allow more information to be obtained. For example, as shown in FIG. 5(G), a display area 1215 for tire pressure warnings can be installed wherein warning messages are sent out when the tire pressure is insufficient; when the pressure of the right rear tire is abnormal, then the warning area h lights up, and the value of the tire pressure is displayed below. As shown in FIG. 5(1), the display area 1216 is used to display the driving conditions behind the body of the vehicle when the car is overtaking. For example, when the vehicle is overtaking towards the left, the driver first turns on the turning indicator with left arrow, this activates the radar on the left side and rear end of the vehicle. When warning area I lights up, this means another vehicle from the left rear side of the subject vehicle is approaching, at the same time, the lower part B of the display area 1216 displays the distance between the subject vehicle and the approaching vehicle. Moreover, a switch (not shown) is added to the rear-view mirror 2' in the vehicle. When the switch is pressed, the microcomputer in the vehicle automatically conducts an internal examining scan on the internal part of the vehicle, as shown in FIG. 5(I), so that the display area 1217 displays the condition of the vehicle, for example, a reminder for the driver whether the water level in the water tank is sufficient, whether the vehicle light is on, whether the doors have been properly shut, whether the gasoline is sufficient, whether the handbreak has been released, etc. Since the above mentioned sensor for reversing the vehicle, sensor for tire pressure and the touch-controlled input device are well-known techniques, they will not be explained in further details. The functions as set forth in FIG. 5(B)~5(H) can all be integrated together to operated in interior mirror 2'. Furthermore, as shown in FIG. 5(J), another embodiment of the display area 121 of FIG. 5(A) is shown. The display area 1218 is a rectangular display area which shows texts, numbers and other information, such as speed, water and oil temperature, etc. Furthermore, as shown in FIG. 5(K), a special sensor 122 is installed in the LCD panel 12' of FIG. 5(A). For example, when special sensor 122 detects that the carbon dioxide content or the temperature in the vehicle is too high, the air conditioner is automatically switched on; or, as the blink frequency of the driver decreases, the sleep-proof device is activated (not shown). These special sensors are used to activate the various electronic devices in the vehicle to provide a comfortable and safe driving environment.

Figure 6:
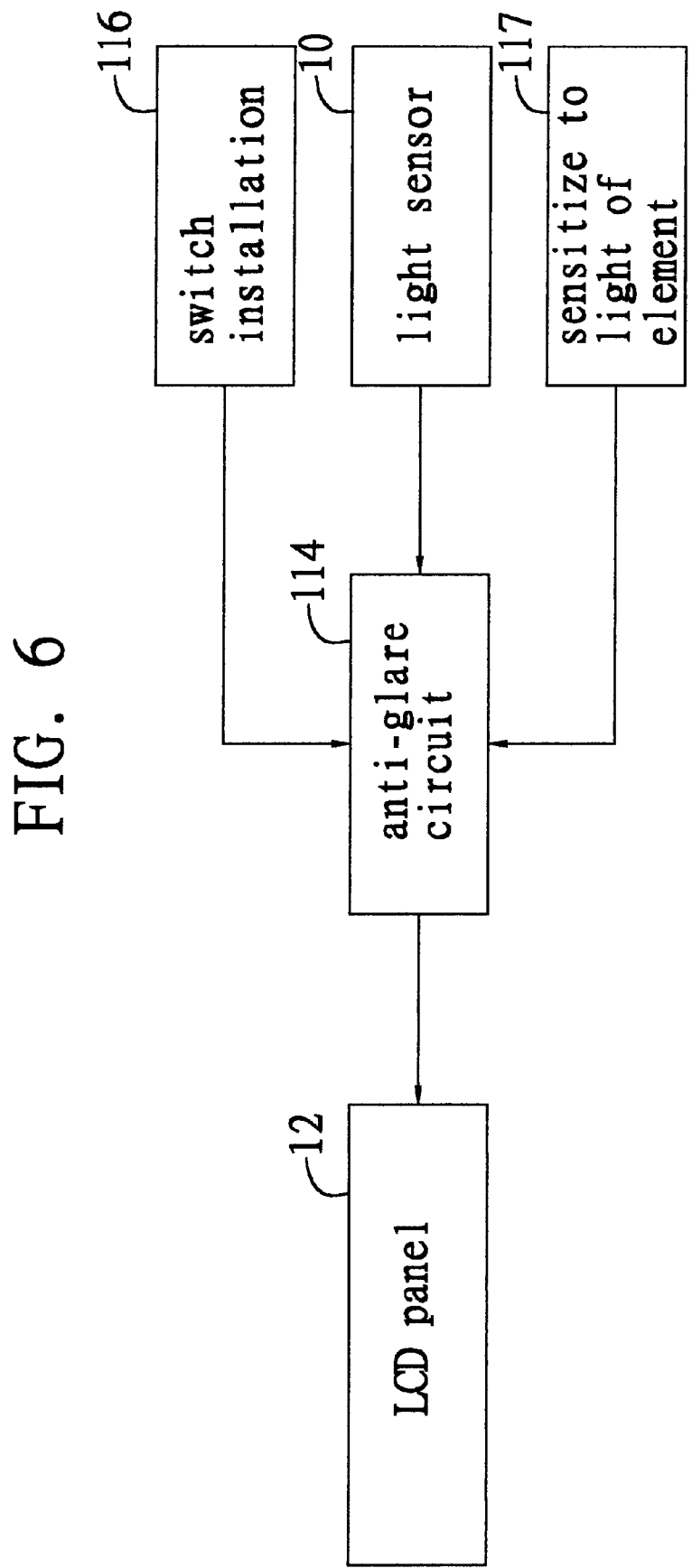
FIG. 6 is a structural block-view of a portion of another embodiment of the vehicle automatic anti-glare device in FIG. 3.

The above-mentioned display area (121.1210–1218) has the characteristics of an expansive-platforms, thus required display functions can be developed in accordance with the needs of the driver or the garage. FIG. 6 is a structure block-diagram showing a part of another embodiment of the rear-view mirror in the vehicle automatic anti-glare device of the present invention. The part of the LCD panel 12 identical to FIG. 3 will not be described. In this embodiment, a switching device 116 and light-sensing element 117 is included, where the switching device 116 is used to allow the driver to decide whether to turn on/off the anti-glare function, and the light-sensing element 117 is used to detect whether the source of light from outside is strong/weak, so that the rear-view mirrors automatically switches on/off the anti-glare function. The light-sensing element 117 may adopt photodiode, which is installed facing the windshield glass, and when it is shone by strong light, the electricity charged by the anti-glare processing circuit 114 to LCD panel 12 is cut off. As such, the anti-glare device can automatically switch off the anti-glare function when the sunlight is strong.

Via the light sensor 10 on the vehicle automatic anti-glare device of the present invention, the vehicle rear-view mirrors can automatically switch on/off the anti-glare function. However, after including the above-mentioned switching device 116 and light-sensing element 117, the vehicle rear-view mirrors become more personalized and flexible in usage.

Under the present invention, the rear-view mirror has the functions of automatic anti-glare, sensors, displays and warnings. The voltage required of the rear-view mirror is only 3V. The temperatures reached are around –20 to 80 degrees C. Thus, the reaction time is very fast and the light-filtering level is 35% to 85%.

Furthermore, since the vehicle automatic anti-glare device must be installed by service centers or professional engineers, a further embodiment is provided to allow the vehicle automatic anti-glare device to be installed by the user. In this embodiment, the vehicle automatic anti-glare device can be added to the current rear-view mirror without modifying the current vehicle. The vehicle automatic anti-glare device can be manufactured on a large scale and commonly used.

Figure 7:
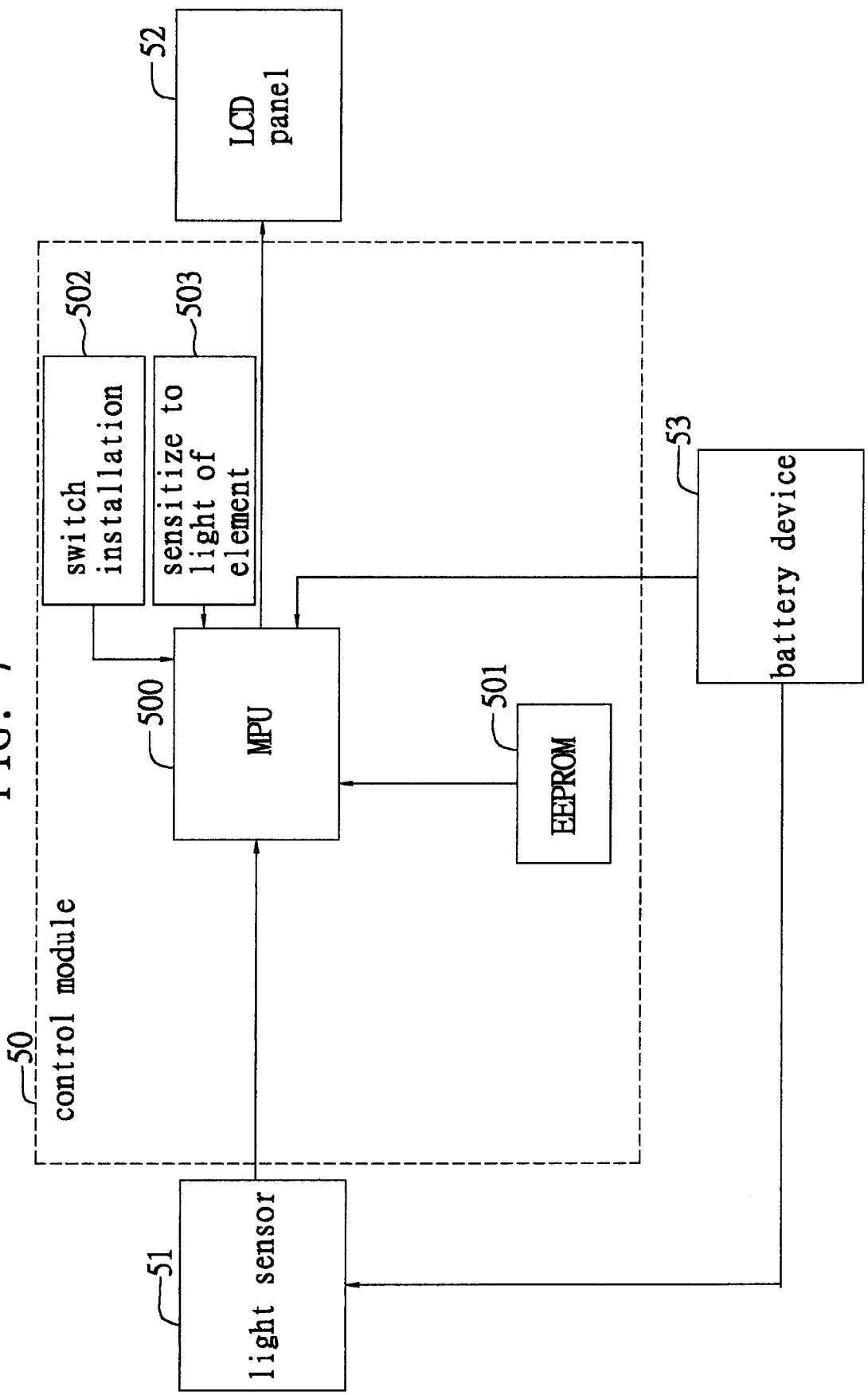
FIG. 7 is a basic structural block-diagram of the vehicle automatic anti-glare device of the present invention.

A basic structural block-diagram of the vehicle automatic anti-glare device in the present invention is provided in FIG. 7. As shown in the drawing, in this embodiment, the present invention includes a light sensor 51, a MPU 501, switching device 502, light-sensing element 503, an EEPROM 501, and a control module 50 of signal port (not shown), a LCD panel 52, and a battery device 53.

The interrelationship between light sensor 51, control module 50, MPU 501, EEPROM 501, and LCD panel 52 are identical to the above description on FIG. 3, thus the details will not be further described. The battery device 53 serves to supply power to the control module 50, so that the LCD panel 52 can be installed by the user without power supply from the vehicle or connecting complex internal circuits and wires of the vehicle.

Figure 8:
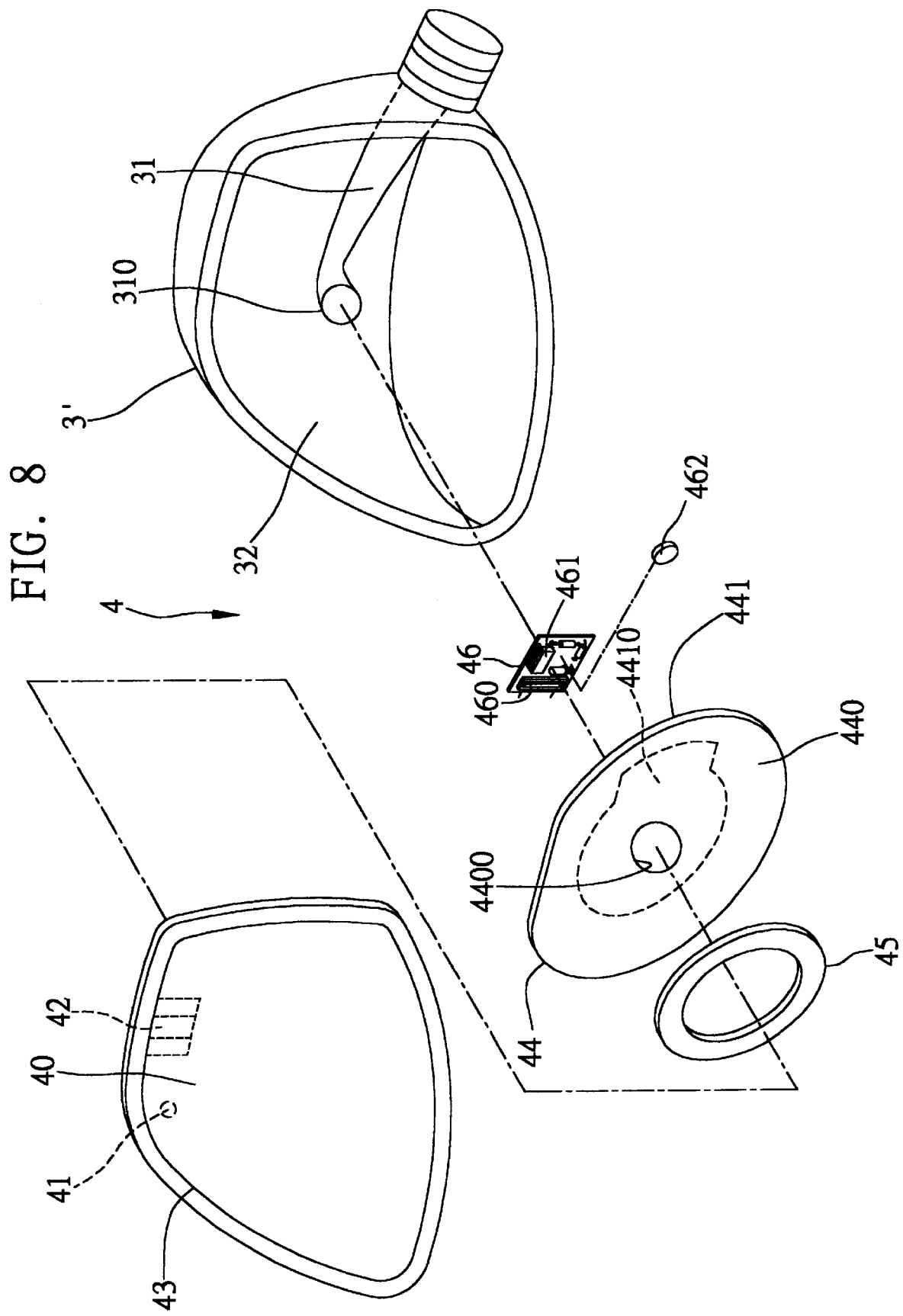
FIG. 8 is an exploded view of the vehicle automatic anti-glare device in FIG. 7, which shows an exploded view of the encapsulated LCD panel 40 being firmly joint with installing box 3' of the exterior mirrors of the vehicle.

Referring to FIG. 8, the exploded view of the vehicle automatic anti-glare device in the embodiment of FIG. 7 is illustrated. In that, an encapsulated LCD panel 40 is firmly attached to the installing box 3' of the rear-view mirror of a vehicle. As shown in the figure, the rear-view mirror installing box 3' has a receiving portion 32 for receiving the exterior mirror and a fixed rod 31 for stabilizing the rear-view mirror in the receiving portion 32. The front end of the fixing rod has a universal connector 310. Thereby, the angle of the rear-view mirror may be adjusted to the upper, lower, left and right sides. Since the rear-view mirror installing box 3' is known in the prior art, the detail will not be further described. Only the part related to the present invention will be described. The light sensing automatic anti-glare device 4 includes a LCD panel 40, a sticky piece 45 and a retainer seat 44.

The LCD panel 40 serves to reflect the image behind the vehicle and has anti-glare function. A silicon toggle 43 covers the outer-surface of LCD panel 40 to prevent moisture and other objects from intruding. A plastic light pipe 42 is electrically connected to the edge of the silicon toggle 43. Liquid crystal transmission molecule direction film is formed on plastic light pipe 42, which is connected to the external power source and is linked to LCD panel 40. This allows positive and negative terminal circuits (not shown), and has a signal output circuit with a light sensor 41 therein (not shown). The light sensor 41 may be a light-sensitive resistor.

The retainer seat 44 sticks the LCD panel 40 to the front side 440 (with respect to the LCD panel 40) of the retainer seat 44 by the LCD panel 40, wherein the sticky medium is a double face tape. The front side retainer seat 440 of the retainer seat 44 has a hole 4400 penetrating to the rear side 441 thereof (with respect to the receiving portion 32 of the rear-view mirror installing box 3). The hole 4400 serves to be linked and attached to universal connector 310 at the front end of the fixing rod 31 in the rear-view mirror installing box 3'. Thus, as the universal joint 310 rotates, the fixing position of the retainer seat 44 and the LCD panel 40 will be changed so that the driver may control the viewing angle of the exterior mirror.

The rear side 441 of the retainer seat 44 has circuit receiving portion 4410 for containing circuit board 46 which is used for controlling a LCD panel 40 and for activating the anti-glare function. Circuit board 46 includes control chip 461 for activating LCD panel 40, signal ports 460 for being connected to the plastic light pipe 42 of the LCD panel 40, and a number of electronic elements. The circuit board 46 is made by surface mounting technology (SMT) so that the circuit board 46 has a smaller width. Since the area of the LCD panel 40 is larger than that of the retainer seat 44, so that the signal transmission film 42 can extend from the outer edge of the LCD panel 40 over to the retainer seat 44, and be connected to the signal port 460 of the circuit board 46 installed at 441 behind the retainer seat 44. Therefore, the anti-glare function can be activated through the circuit board 46 to control the LCD panel 40.

An isolating rubber film (not shown) is placed between the battery 462 and circuit board 46. The isolating rubber film serves to isolate any end of the positive or negative end of the battery 462 so that no power is discharged until the user installs the light sensing automatic anti-glare device 4 when the isolation rubber film is torn away. Then the power is conductive. The battery 462 may be a mercury battery or a lithium battery.

Referring to FIG. 9, an exploded view for the installation of the vehicle automatic anti-glare device in another embodiment of the present invention in FIG. 7 is illustrated. In that, the exploded view of an encapsulating LCD panel 60 is shown. Other than extending with a signal transmission film 62, hooks (64) for being suspended by the interior mirror is enclosed. A circuit-installing frame 65 is suspended between the rear side of the LCD panel 60 and the prior art rear-view mirror 65. The circuit-installing frame 65 has a circuit board 650. The light sensing automatic anti-glare device of this embodiment is identical to the vehicle automatic anti-glare device illustrated in FIG. 7.

In this embodiment, the visual area of the LCD panel (40, 60) of the vehicle automatic anti-glare device (4, 6) is determined by the minimum area of specific range of different vehicle lenses. Therefore, it is unnecessary to design different molds according to different sizes of LCD panels. It can be manufactured on a large scale without causing an inventory problem. Moreover, a battery 53 is provided as a power supply. Further, a retainer seat 44 or hook (64) serves to fix the vehicle automatic anti-glare device (4, 6) to the rear-view mirror (3', 5) so that the user may install the present invention by himself (or herself).

In summary, the present invention has the following advantages:

1. In the present invention, the vehicle automatic anti-glare device can be automatically switched into a "light filtering" or "non-light filtering" mode. When it is in "displaying mode", it becomes a rear-view mirror with automatic anti-glare functions which displays the operating conditions of the devices in the car. Therefore, the defect in the prior art rear-view mirror is improved. Moreover, a convenient driving environment is provided to the driver.

2. The driver does not have to view the dashboard by lowering the head. The rear-view mirror of the present invention allows the device operations in a vehicle to be viewed clearly.

The present invention is the preferred embodiment, and the present invention is not limited by it; variations may be allowed. For example, in FIG. 2, a light intensity contrast table can be programmed in advance to the EEPROM 111, and the light sensor 10 senses a light intensity signal and transmits it to the processor 110. Processor 110 compares the light intensity with that in the EEPROM 111 to determine whether the anti-glare processing circuit 114 should apply voltage to the LCD panel 12. If the light intensity is strong, the processor 110 will cause the anti-glare processing circuit 114 to apply voltage to the light source so that the LCD panel 12 is converted into a "light filtering" mode from a "NON-light filtering" mode. Thus, the glare is prevented effectively. The scope of rights under the present invention should be based on the scope of the following claims.

What is claimed is:

1. A vehicle automatic anti-glare device comprising:
   a LCD panel having a function of being converted into a "non-light filtering" mode from a "light filtering" mode as voltage is applied thereon;
   a reflection film installed at a back of the said LCD panel, so that when the said LCD panel is in a "light filtering" mode, the said reflection film can reflect the light cast on the said LCD panel, allowing the said LCD panel to reflect images;
   a light sensor for detecting the light intensity of the light radiated to the said LCD panel and then sends out a signal which corresponds to the intensity of the light; and
   a control module for receiving an output signal from said light sensor; when the signal exceeds the default value, then voltage is applied to the LCD panel, so that said LCD panel is converted into a "light filtering" mode.

2. The vehicle automatic anti-glare device as claimed in claim 1, wherein the control module receives the data from a microcomputer in a vehicle and then transmits the said data to said LCD panel.

3. The vehicle automatic anti-glare device as claimed in claim 2, wherein the output information includes vehicle speed, water and oil temperature, condition of the car door, condition of the vehicle light and condition of petrol usage.

4. The vehicle automatic anti-glare device as claimed in claim 1 or 2, wherein said control module includes
   a processor for running a control program stored in a memory or a chip on a printed circuit board;
   a data-receiving device for receiving signals from a microcomputer in a vehicle;
   an EEPROM for storing a display driving program of the said LCD panel and storing a control program for comparing signals sent out from the light sensor with a default value;
   a RAM for storing data from said microcomputer in a vehicle and received by said data receiving device;
   a driving display circuit for receiving the data from said data receiving device according to said processor for driving devices on the LCD panel; and
   a anti-glare processing circuit for applying voltage to said LCD panel.

5. The vehicle automatic anti-glare device as claimed in claim 4, wherein said data receiving device receives data from external electronic devices.

6. The vehicle automatic anti-glare device as claimed in claim 5, wherein said electronic device is a PDA.

7. The vehicle automatic anti-glare device as claimed in claim 6, wherein the information stored inside the PDA is displayed on the LCD panel.

8. The vehicle automatic anti-glare device as claimed in claim 5, wherein the electronic device is cellular phone.

9. The vehicle automatic anti-glare device as claimed in claim 8, wherein the information stored inside the cellular phone is displayed on the LCD panel.

10. The vehicle automatic anti-glare device as claimed in claim 5, wherein the information entered is GPS information.

11. The vehicle automatic anti-glare device as claimed in claim 10, wherein map is displayed on the LCD panel.

12. The vehicle automatic anti-glare device as claimed in claim 1, wherein said reflection film is plated with chromium in a normal temperature.

13. The vehicle automatic anti-glare device as claimed in claim 1, wherein an ultraviolet-proof coating process is performed on a parallel light filter mirror at outer layer of LCD panel.

14. The vehicle automatic anti-glare device as claimed in claim 1, wherein a switch device is installed between said LCD panel and said control module for automatically switching an anti-glare function .

15. The vehicle automatic anti-glare device as claimed in claim 4, further comprising a sleep-proof device having a needle type camera for detecting the driver's frequency of blinking and a speaker for playing warning messages to alert the driver.

16. The vehicle automatic anti-glare device as claimed in claim 15, wherein said EEPROM stores a control program and related data of said needle type camera.

17. The vehicle automatic anti-glare device as claimed in claim 10, wherein said related data includes a default value and warning messages from said speaker, and the default value is used to be compared with a signal from said needle type camera.

18. The vehicle automatic anti-glare device as claimed in claim 1, wherein said automatic anti-glare device is installed in a rear-view mirror in a vehicle.

19. The vehicle automatic anti-glare device as claimed in claim 18, wherein a number of fixed patterns of pictures are arranged on said LCD panel; said fixing patterns include: a vehicle direction displaying portion, an oil consumption displaying portion, a speed displaying portion, a head light control displaying portion, an engine temperature displaying portion, a vehicle parking distance displaying portion, a communication antenna displaying portion and a wiper displaying portion.

20. The vehicle automatic anti-glare device as claimed in claim 1, wherein said automatic anti-glare device is installed on the rear-view mirror of a vehicle.

21. The vehicle automatic anti-glare device as claimed in claim 20, wherein a back side of said LCD panel is installed with a battery device and a retainer seat for receiving said control module so that said LCD panel has power for operation and via the said retainer seat, said LCD panel is firmly connected to said rear-view mirror of a vehicle.

22. The vehicle automatic anti-glare device as claimed in claim 21, wherein the visual area of the said LCD panel is determined by the minimum area of mirror lenses of each vehicle.

23. The vehicle automatic anti-glare device as claimed in claim 21, wherein said LCD panel is stuck to said retainer seat by a sticky medium.

24. The vehicle automatic anti-glare device as claimed in claim 23, wherein said sticky medium is a double-sided tape.

25. The vehicle automatic anti-glare device as claimed in claim 21, wherein said battery is a mercury battery.

26. The vehicle automatic anti-glare device as claimed in claim 21, wherein said battery is a lithium battery.

27. The vehicle automatic anti-glare device as claimed in claim 22, wherein the edges of the visual area is kept wide to allow room for adjustment to suit different sizes of vehicles.

28. The vehicle automatic anti-glare device as claimed in claim 21, wherein said light sensor is a light sensitive resistor.

29. The vehicle automatic anti-glare device as claimed in claim 21, wherein said control module includes an EEPROM for storing a control program related to said control module and storing a default value for comparing with a signal sent out from said light sensor; a processor unit for running said control program of said control module; and a signal port for receiving a signal inputted from said light sensor and sending signal to said LCD panel.

30. The vehicle automatic anti-glare device as claimed in claim 29, wherein said LCD panel is connected to a signal terminal for being connected to a signal connecting port of said control module.

31. The vehicle automatic anti-glare device as claimed in claim 21, wherein said control module has a structure including a circuit board and the electronic parts installed in the circuit board.

32. The vehicle automatic anti-glare device as claimed in claim 1, wherein said control module includes the light-sensing element; when the light-sensing element senses strong light, the anti-glare function is switched off.

33. The vehicle automatic anti-glare device as claimed in claim 32, wherein the light-sensing element is photodiode.

* * * * *